UNITED STATES PATENT OFFICE.

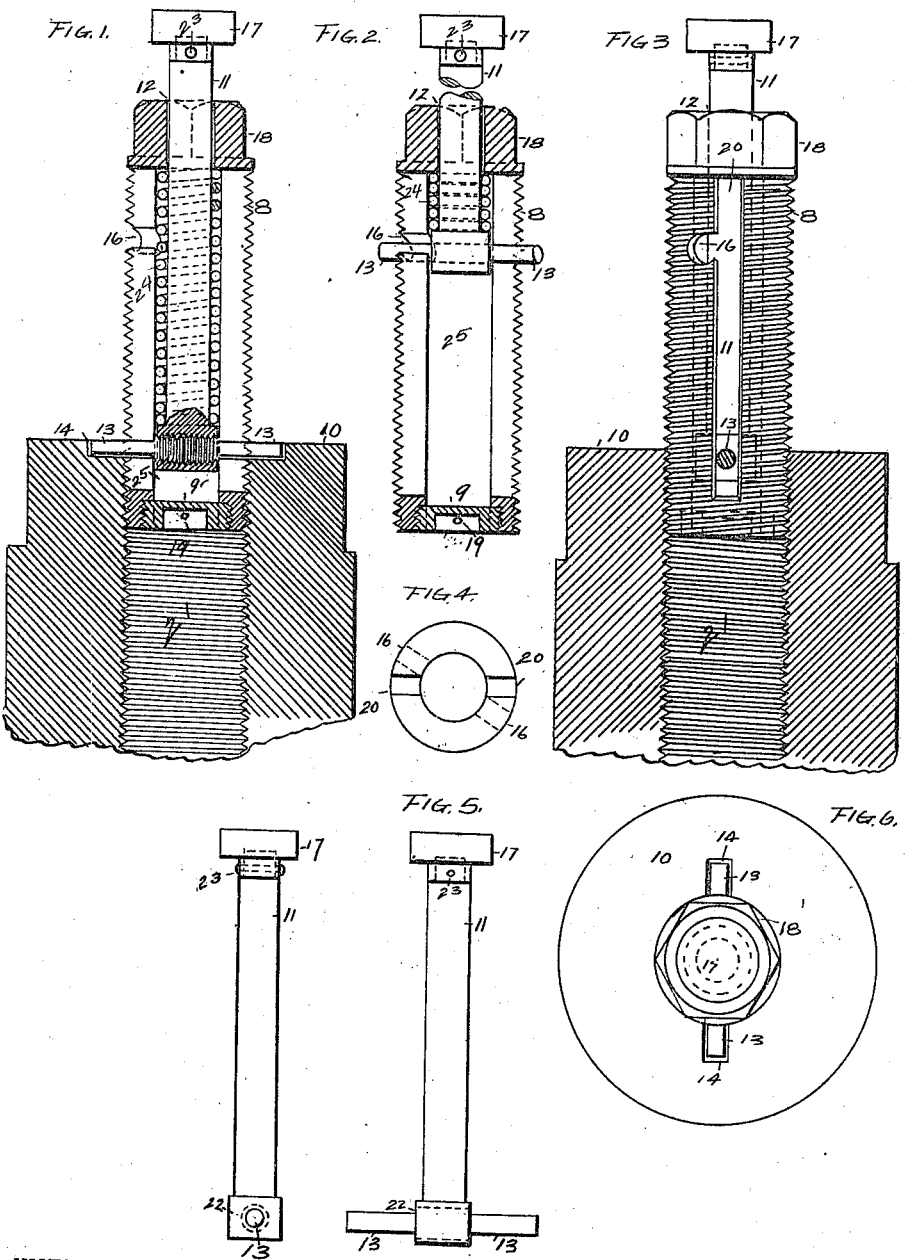

DAVID F. HERVEY, OF LOGANSPORT, INDIANA.

OILING DEVICE.

995,675.

Specification of Letters Patent. Patented June 20, 1911.

Application filed July 12, 1910. Serial No. 571,644.

*To all whom it may concern:*

Be it known that I, DAVID F. HERVEY, citizen of the United States, residing at Logansport, in the county of Cass and State of Indiana, have invented certain new and useful Improvements in Oiling Devices, of which the following is a specification.

My invention relates to improvements in hard oil or hard grease plug oiling devices in which plugs are used to force the hard grease downwardly on to the crank pin.

The object of my invention is to provide a locking device for oil cups in which plugs are used to force the hard grease downwardly into the aperture of the driving rod.

Another object of the invention is to provide a locking device and hard grease plug, which, by its construction, will not only lock the plug and prevent its turning and thereby losing out, but will provide means for the passage of air through the same, thereby cooling the plug somewhat, and preventing undue expansion as would be the case if the driving rod should become heated.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a longitudinal section through my improved device shown applied. Fig. 2 is a detail longitudinal section of the plug. Fig. 3 is a section at right angles to Fig. 1 showing the plug in elevation. Fig. 4 is a detail plan showing the relative location of the slot and notches. Fig. 5 shows in positions at right angles to each other the stem. Fig. 6 is a plan of the device complete.

Like letters of reference indicate like parts throughout the several views.

Referring to the several views, the principal parts are as follows: plug 8, spring 24, stem 11, knob 17 and plug 9. Plug 8 is hollow for most of its length and also slotted for part of its length. The periphery of the plug 8 is threaded. The plug also contains a small hole, recess, or notch 16. The upper end of plug 8 is finished like a nut 18 so a wrench may be used when necessary. The bore of the plug 8 contains a spring 24 and a T shaped stem 11. The stem is provided with a rod 13 at right angles to the lower end. The rod 13 is secured in the stem 11 by screwing therein. The stem 11 is also provided with a knob 17 in order to give a firmer grip on the stem by the fingers when it is desired to raise the stem. The knob 17 is secured to the stem 11 by a rivet 23. It can also be secured to the stem 11 by threading the stem and screwing the knob on.

At any time it is desired to use the plug 8 and force the hard grease downwardly into the aperture 21, take hold of the stem 11 at knob 17 and raise the stem until the rod 13 in the stem 11 is opposite the notch 16. Then give the stem 11 a slight turn with the hand until the rod 13 drops into the notch 16. The lifting of the rod 13 from the slot 14 unlocks the plug 8 and it can then be screwed down or taken out entirely. To lock the plug again, remove the rod 13 from hole 16 and let it rest in slot 14, which is a groove in the side rod 10. The rod 13 will be forced to remain therein on account of the spring 24 exerting a downward tension.

To remove the stem 11 from the plug 8 remove the plug 9 therefrom by removing the rivet 19 and unscrewing. The knob 17 of stem 11 should also be removed. The plug 9 is also designed to answer the purpose of a socket nut.

What I claim as new and desire Letters Patent for is:

1. The combination with a side rod having a threaded bore, of a cylinder having threaded engagement therewith and having a longitudinal slot with a lateral notch communicating with said slot, a stem movable within the cylinder, lateral means on the stem movable through the slot of the cylinder for engaging said notch, said lateral means engageable also in recesses in the outer end of the driving rod.

2. A hollow plug longitudinally slotted and provided with a lateral recess opening into the slot, means within which said plug is endwise movable to serve as a plunger, a stem in the plug, lateral means on the stem for engagement with said recess by partial rotation of the stem, a plug at the inner end of said hollow plug and removable means engaging the same.

3. A hollow plug longitudinally slotted and provided with a lateral recess opening into the slot, a stem in the plug, lateral means on the stem for engagement with said recess by partial rotation of the stem, a plug at the inner end of said hollow plug, removable means engaging the same, a spring in the hollow plug exerting an inward tension on the stem, and a side rod having a slot in the end receiving said lateral means, and having a threaded bore in which said hollow plug is endwise movable to form a plunger.

4. A hollow plug longitudinally slotted and provided with a lateral recess opening into said slot, a stem in the plug, means on the stem for engagement with said recess by a partial turn of the stem, a spring in the plug, said means extending through the slot and the plug having screw threaded engagement with a fixed support and serving as a plunger for forcing out the grease.

DAVID F. HERVEY.

Witnesses:
JOSEPH BARKER,
JAMES W. BALL.